UNITED STATES PATENT OFFICE 2,678,333

AMINOMETHYLSULFONIC ACID IN THE MANNICH AND RELATED REACTIONS

Howard D. Hartough, Pitman, and Joseph J. Dickert, Jr., Westville, N. J., assignors to Socony-Vacuum Oil Company, Incorporated, a corporation of New York No Drawing. Application April 29, 1950, Serial No. 159,126

6 Claims. (Cl. 260—509)

The present invention relates to the Mannich reaction, and, more particularly, to the improved results obtained employing aminomethylsulfonic acid in place of ammonium chloride in the Mannich reaction and in the aminomethylation of olefins.

As is well-known, the Mannich reaction is the designation for the reaction discovered by Carl Mannich in 1912 which takes place between a compound having at least one hydrogen atom of pronounced reactivity, ammonia or a substituted ammonia, usually in the form of a hydrohalide, and formaldehyde. Illustrative of compounds having a reactive hydrogen atom ("Organic Reactions," volume 30, page 304, et seq.) are cyclohexanone, phenol, malonic acid esters, etc.

In the co-pending application for United States Letters Patent Serial No. 129,948, filed November 29, 1949, in the names of Howard D. Hartough, Joseph J. Dickert, Jr. and Seymour L. Meisel, now Patent No. 2,647,117, it has been shown that olefins react with ammonia, primary amines and primary diamines in the form of hydrohalides, and formaldehyde to yield tetrahydrooxazino-methanes.

Furthermore in the co-pending application for United States Letters Patent Serial No. 36,449, filed July 1, 1948, in the name of Howard D. Hartough, now Patent No. 2,609,374, the preparation of thenylaminomethylsulfonic acids, $R_nC_4H_{3-n}SCH_2NH_2CH_2SO_3H$ where R is an electropositive substituent, and the preparation of the corresponding thenyl formaldimines by hydrolysis of the thenylaminomethylsulfonic acids are described.

It has now been discovered that aminomethylsulfonic acid can be substituted for ammonium hydrohalide in the Mannich reaction and the reaction with olefins to which reference has been made hereinbefore and better results obtained due to the reduction or elimination of side reactions.

Aminomethylsulfonic acid can be prepared as described in the prior art but preferably as described in the co-pending application Serial No. 64,706, filed December 10, 1948, in the names of Joseph J. Dickert, Jr. and Howard D. Hartough, now abandoned.

Briefly, aminoalkylsulfonic acid can be prepared in the following manner:

Sulfur dioxide, an aliphatic aldehyde for example formaldehyde, acetaldehyde and the like and one of the group consisting of ammonia, primary amines and secondary amines, are reacted in dilute acid solution. Thus, for example, aminomethylsulfonic acid can be prepared by mixing two moles of formaldehyde in the form of an aqueous 36 per cent solution thereof and about one mole of ammonium chloride. The mixture is heated until the temperature reaches 40° C. Then a stream of sulfur dioxide is introduced into the mixture. The introduction of the sulfur dioxide and the heating of the solution is continued until a temperature of about 80° C. is reached whereupon the heating is discontinued but the introduction of sulfur dioxide continued for about 20–30 minutes. The reaction mixture is allowed to cool to ambient temperatures and the aminomethylsulfonic acid recovered.

The Mannich reaction can be illustrated by the reaction between acetophenone, ammonium chloride and formaldehyde as given by F. F. Blicke in "Organic Reactions," volume I, page 304. (The reactive hydrogen atom is underlined.)

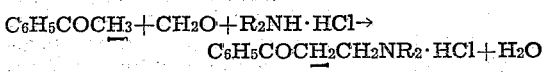

The reaction between olefins, ammonia or primary amines or primary diamines and formaldehyde as described in the aforementioned co-pending application appears to follow the course indicated by the following equations:

(1)

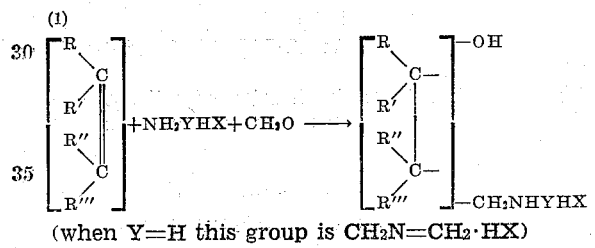

(when Y=H this group is $CH_2N=CH_2 \cdot HX$)

I (2)

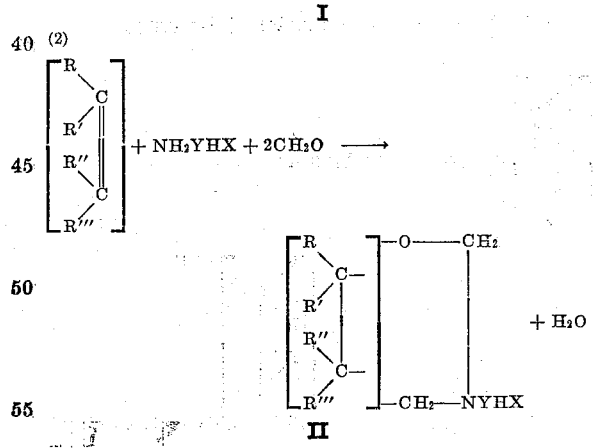

II (When Y is H the group is —CH₂N=CH₂·HX and no additional formaldehyde is necessary to form compound II)

(3)

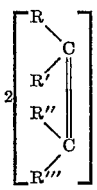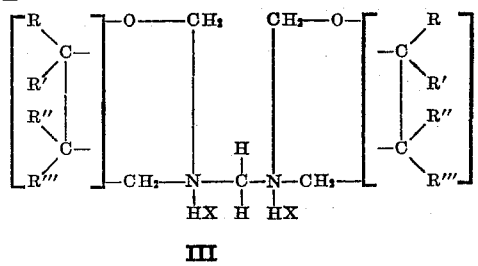

III

When Y is hydrogen, the compound I is a gamma hydroxyformaldimine hydrohalide from which the free base, i. e., the formaldimine is obtained by causticizing the aqueous solution of the hydrohalide. However, when Y is an alkyl or aryl or alkaryl or aralkyl group compound I is an N-substituted gamma hydroxypropyl-amine hydrohalide from which the free amine is obtained by causticizing the aqueous solution of the hydrohalide. Compound II is a substituted 1,3-tetrahydrooxazine hydrohalide from which the free base; i. e., substituted 1,3-tetrahydrooxazine, can be obtained by causticizing the aqueous solution of the hydrohalide. Compound III is bis(substituted-1,3-tetrahydrooxazino)-methane hydrohalide from which the free base; i. e., bis-(substituted-1,3-tetrahydrooxazino)-methane, can be obtained by causticizing the aqueous solution of the hydrohalide.

These reactions take place with aminomethylsulfonic acid in a manner which is illustrated by the following equations:

(4) R—H+CH₂O+NH₂CH₂SO₃H→
R—CH₂NHCH₂SO₃H+H₂O (4a) Equation 4 can be illustrated with acetophenone, a compound having a reactive hydrogen atom C₆H₅COCH₃ + CH₂O + NH₂CH₂SO₃H $\xrightarrow{H_2O}$
C₆H₅COCH₂CH₂NHCH₂SO₃H + H₂O (4b) With an olefin Equation 4 becomes

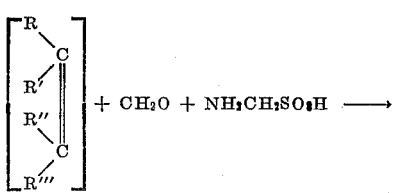 + CH₂O + NH₂CH₂SO₃H ⟶

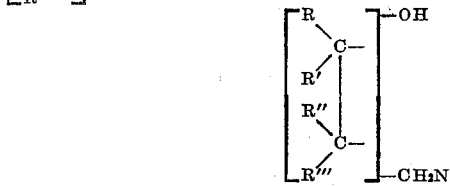

Thus, the reaction involving styrene; i. e., phenylethylene

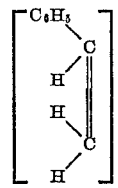

can be illustrated by the following equation:

(5)

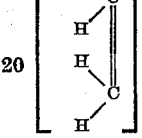 + CH₂O + NH₂CH₂SO₃H $\xrightarrow{H_2O}$

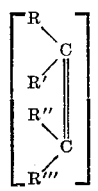

As described in co-pending application Serial No. 129,948, the following olefinic compounds are illustrative of the compounds which react:

Styrene, alpha-methylstyrene, diisobutylene, isobutylene, 1-butene, a mixture of 38.6 per cent divinylbenzene, 11.7 per cent diethyl benzene, 43.6 per cent ethylvinylbenzene and 6 per cent high boiling material, 2-ethyl-1-hexene, 2-methyl-1-pentene, allyl alcohol, alpha-pinene, beta-pinene, 2-ethyl-2-butene, 2,3-dimethyl-1-butene, 2,3-dimethyl-1-pentene, 2-methyl-1-heptene, 2,3-dimethyl-1-hexene, 2,3,4-trimethyl-1-pentene, 3 - methyl - 2 - isopropyl - 1 - butene, 2-methyl-1-undecene, 2-methyl-1-heptadecene, 9-11-linoleic acid, 1-phenyl-1-butene, 2-phenyl-4-methyl-2-hexene, 2-cyclopropyl-1-propene, 1-isopropenyl-2-methyl-3-cyclohexene (o-menthadiene), 1-methyl-4-isopropenyl - 1 - cyclohexene (dipentene, limonene), 1,2 - diphenylethylene (stilbene), vinylphenol, 3-vinylguaiacol, vinylacrylic acid, 2-methyl-4-vinyl-thiophene, 1-furyl-1-butene, vinyl-pyridine, 1-pyrryl-1-propene, and in general olefinic compounds conforming to the generic formula where R is hydrogen, an alkyl group having less than 17 carbon atoms, an aryl group, alkaryl group in which the alkyl substituent has less than 9 carbon atoms, an aralkyl group in which the alkyl portion of the group has less than 9 carbon atoms, a cycloalkyl group, or a heterocyclic group, R' is R, hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, or a heterocyclic group; R" is R, R', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, or a heterocyclic group; and R''' is R, R', R", hydrogen, an alkyl group having less than 17 carbon atoms, The amino-methyl or alkyl sulfonic acids formed in these reactions are stable as the sodium salts in aqueous solution if neutralized to a phenolphthalein end point and, in that form, can be stored indefinitely. An excess of caustic (about one mole excess) causes decomposition of the sulfonic acids into the formaldimines. This decomposition can be illustrated by the following equations (hereinafter AMS will be used to designate aminomethylsulfonic acid, $NH_2CH_2SO_3H$).

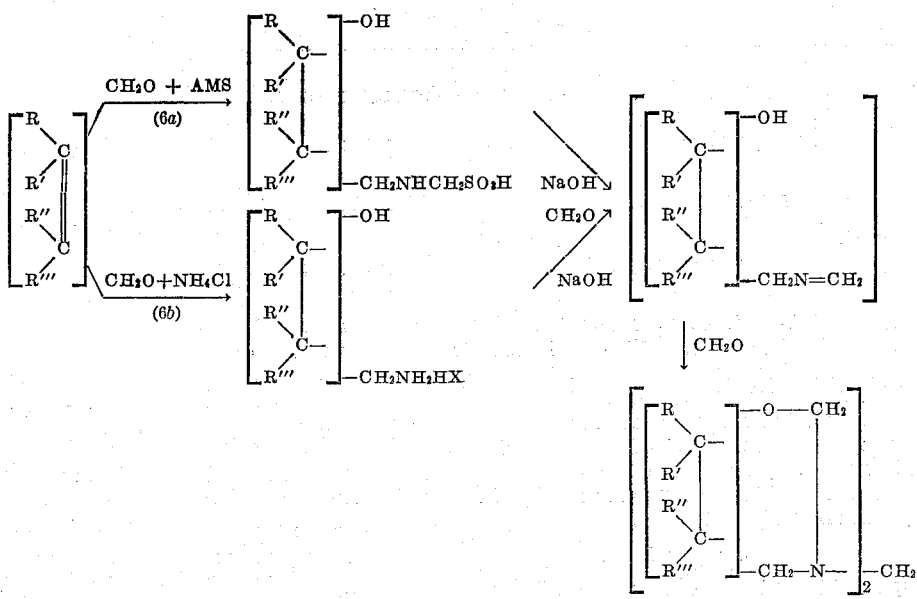

an aryl group, an alkaryl group in which the alkyl substituent has less than 9 carbon atoms, an aralkyl group in which the alkyl portion of the group has less than 9 carbon atoms, a cycloalkyl group, or a heterocyclic group. Furthermore, when any of R, R', R" and R''' is other than H or $CH_3$, it can be substituted with such groups as $NO_2$, CN, X, COOH, etc. (X=Cl, Br or I.) These substituents preferably are removed by at least 2 carbon atoms from the olefinic moiety. However, there are two limitations; to wit, no more than three and preferably, only two, of R, R', R" and R''' may be substituents other than hydrogen and when one of the pair of substituents R, R', or R", R''' is hydrogen, then the other member of the pair shall be a substituent having a double bond in conjugation with the double bond of the parent olefin. Illustrative of the olefinic compounds in which the substituent groups are also substituted by inorganic substituents such as sulfur and/or oxygen, the halides and, in general, electron withdrawing substituents with the exception of $NO_2$ (electron withdrawing substituents are defined as those substituents which cause meta substitution in the benzene nucleus) are the following: Vinyl sulfone, halogenated vinyl sulfones such as alpha-chlorovinyl-beta-chloroethyl sulfone, the aryl and alkyl vinyl sulfones corresponding to the formula $R^vSO_2CH=CH_2$ ($R^v$ is any group selected from the class of alkyl, aryl, or aralkyl, alkaryl, or cycloalkyl), benzylpropenyl sulfone, vinyl ethers and homologues thereof and in general, any compound in which a substituent activates the olefinic bond.

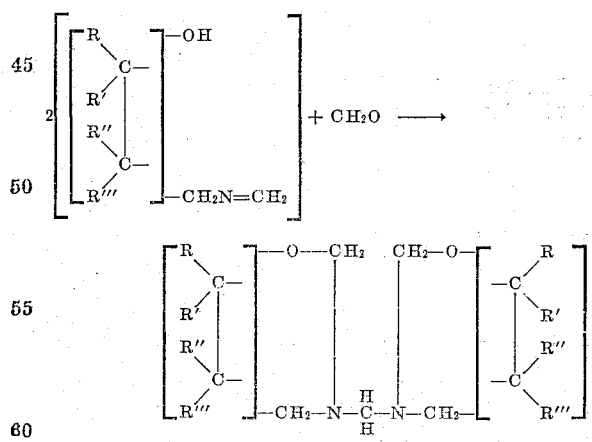

M. P. 127.5–128.5.

Whether the end product be obtained by the reaction illustrated by Equation 6a or Equation 6b the compounds have the same empirical formula, for styrene as the starting olefin, $C_{10}H_{13}NO$ and a melting point of 127.5–128.5° C. by mixed melting points.

The reaction of tertiary olefins such as diisobutylene fundamentally is the same although a new olefinic compound may be formed by dehydration of the tertiary hydroxyl group forming a new olefinic bond which can react a second time. This is illustrated by the reaction of the 2,4,4-trimethylpentene-1-isomer of diisobutylene which can be represented by the following equations:

(7)

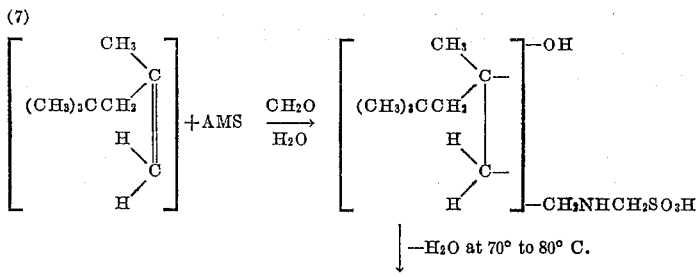

↓ —H₂O at 70° to 80° C.

(8)

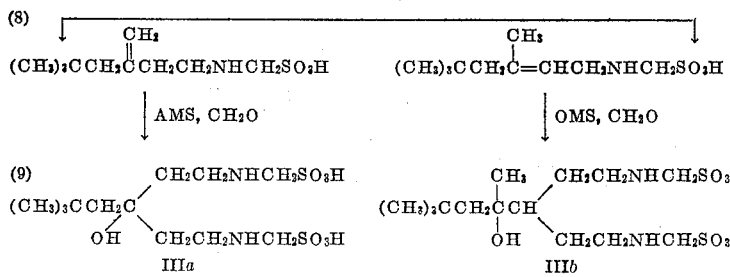

Compound III (i. e., IIIa and IIIb, the two forms obtained from the diisobutylenes) dehydrates to give the corresponding olefin. For example, for the form of compound III represented by Formula IIIb, the reaction can be carried on until three of the [—CH₂NHCH₂SO₃H] groups are introduced. Then the other methyl group beta to the [—OH] group would enter into the dehydrations until a total of six

[—CH₂NHCH₂SO₃H]

groups had been introduced into the reactive portion of the molecule to yield a compound represented by the following formula (10)

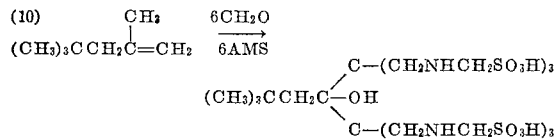

The foregoing can be generalized and represented by the equation (11)

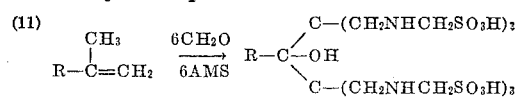

where R is an aryl group.

Where R is an alkyl group further substitution can take place. Polysubstitution of the foregoing character has been encountered when employing alpha-methylstyrene, polymer gasoline and similar materials.

It is to be noted that the conjugated diolefins such as butadiene, 2,3-diphenyl butadiene, 2,3-dimethylbutadiene, 2-chloro-butadiene (chloroprene) and others react in a similar manner.

As stated before, aminomethylsulfonic acid can be substituted for ammonium hydrohalide in the Mannich reaction and in the reaction between an olefinic compound, formaldehyde and ammonium hydrohalide. Since the Mannich reaction has been known for years, it does not require extensive illustration. On the other hand, the reaction involving olefinic compounds being of much more recent discovery that reaction is illustrated but not limited, by the following examples.

EXAMPLE I

To 56 parts by weight of aminoethylsulfonic acid (AMS) (about 0.5 mole) were added 150 parts by weight of water and about 50 parts by weight of an aqueous 36 per cent formaldehyde solution (about 0.6 mole formaldehyde). The mixture was stirred and heated to about 50° C. About 54 parts by weight of styrene (about 0.5 mole) were added and the mixture was heated to about 70° C. Thereafter, the mixture was heated to and kept at about 75° C. for about two hours and then cooled to 55° C. About 25 per cent of the styrene was recovered unreacted. After standing about sixteen hours about 32 parts by weight of crystalline 3-hydroxy-3-phenyl-propyl-aminomethylsulfonic acid monohydrate was filtered from the reaction mixture. After recrystallization from hot ethanol the crystals melted with decomposition at 124°–125° C.

The crystalline product was analyzed as indicated herebelow:

|  | Percent Carbon | Percent Hydrogen | Percent Nitrogen | Percent Sulfur | Percent H₂O |
|---|---|---|---|---|---|
| Calculated | 45.63 | 6.46 | 5.32 | 12.2 | 6.8 |
| Observed | 45.51 | 6.78 | 5.48 | 12.4 | 7.5 |

The aqueous portion of the reaction mixture was causticized and extracted with diethyl ether. Upon evaporation of the ether about 41 parts by weight of product were obtained. Upon recrystallization from ethanol the melting point of the product was found to be 125.5°–126° C. A mixed melting point determination of the recrystallized product with bis-(phenyl-1,3-tetrahydrooxazino)-methane produced as described in co-pending application Serial No. 129,948 yielded no depression of the melting point establishing the identity of the product.

EXAMPLE II

To 224 parts by weight of styrene (about 2.15 moles) were added about 222 parts by weight of aminomethylsulfonic acid (about 2 moles), about 170 parts by weight of a 36 per cent aqueous solution of formaldehyde (about 2 moles of formaldehyde) and about 200 parts by weight of water. The mixture was stirred and heated to about 70° C. However, the temperature rose to about 75° C. but no external cooling was necessary to hold the reaction temperature between about 75°–80° C. for about two hours. About 5 parts by weight of styrene were recovered by steam distillation. The reaction mixture was neutralized with 300 parts by weight of a 30 per cent aqueous sodium hydroxide solution and extracted with diethyl ether. The solvent was removed from the extract and 113 parts by weight of product recovered. The product, an oil, was dissolved in about 160 parts by weight of ethanol, 20 parts by weight of water added and the mixture was allowed to stand. No crystals formed.

Fifty-seven parts by weight of the oil were distilled under reduced pressure to yield about 24 parts by weight of styrene and about 17 parts by weight of phenyl-1,3-tetrahydrooxazine (II) boiling point 97° C. at 1 mm. of mercury, $n_D^{20}$ 1.5424 and 16 parts by weight of still residue.

The 17 parts by weight of distillate were analyzed and found to contain: 73.05 per cent carbon; 7.65 per cent hydrogen; 8.98 per cent nitrogen and to have a molecular weight of 160. These values are to be compared with the corresponding values for phenyl-1,3-tetrahydrooxazine, $C_{10}H_{13}NO$.

|  | Percent Carbon | Percent Hydrogen | Percent Nitrogen | Molecular Weight |
|---|---|---|---|---|
| Calculated | 73.62 | 7.98 | 8.59 | 163 |
| Observed | 73.05 | 7.65 | 8.98 | 160 |

The still residue was analyzed and the results compared with the calculated values for $C_{21}H_{26}N_2O_2$.

The analyses and molecular weight of the still residue indicate that this product had the following structure:

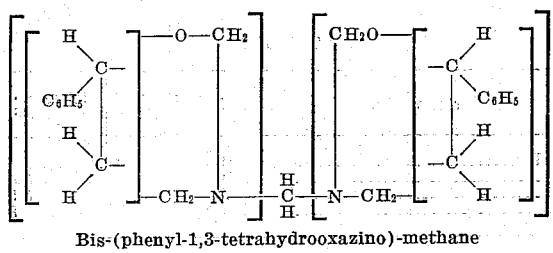

Bis-(phenyl-1,3-tetrahydrooxazino)-methane

Compound II formed a phenylthiourea in the conventional procedure which melted at 126.5°–127° C. and a methiodide having a melting point of 177°–177.5° C. Mixed melting points of these derivatives with similar derivatives derived from a similar compound produced in accordance with the disclosure of co-pending application Serial No. 129,948 showed no depression.

The extracted mother liquor was treated further with excess solid caustic. In this manner about 118 parts by weight of ether-soluble extract was obtained. This material crystallized to III on evaporation of the ether. Further treatment of the mother liquor with a large excess of solid caustic yielded an additional 113 parts by weight of the bis-(phenyl substituted tetrahydro-1,3-oxazino)-methane.

Recrystallization of III from methanol yielded pure material having a melting point of 126.5°–127.5° C. Repeated crystallization of the crude III from alcohol concentrated the substituted 1,3-tetrahydrooxazine in the mother liquors. This material was identified by the characteristic phenylthiourea.

EXAMPLE III

About 520 parts by weight of styrene (about 5 moles), about 555 parts by weight of aminomethylsulfonic acid (about 5 moles), about 420 parts by weight of 36% aqueous formaldehyde solution and about 200 parts by weight of water were mixed, stirred vigorously and heated to 60° C. The source of external heat was removed but the temperature of the mixture rose to about 85° C. The reaction mixture was cooled by external means to 70° C. The external cooling means was removed and the reaction temperature allowed to drop to 25° C. The reaction mixture became almost solid and about 500 parts by weight of water were added to facilitate removal of the reaction mixture from the reaction vessel.

The reaction mixture was filtered and the filter cake dried by suction for about one hour. Thereafter, the filter cake was air dried. About 1030 parts by weight of air dried product were obtained. After recrystallization from hot ethanol, the melting point was 124°–125° C. A mixed melting point with the compound obtained in Example I showed no depression. The recovery of 1030 parts by weight represents a yield of 78.5% based upon a theoretical yield of 5 moles of $C_6H_5CHOHCH_2CH_2NHCH_2SO_3H \cdot H_2O$.

*Analysis*

|  | Percent C | Percent H | Percent N | Percent S | $H_2O$ |
|---|---|---|---|---|---|
| Calculated for $C_{10}H_{15}NO_4S \cdot H_2O$ | 45.63 | 6.46 | 5.32 | 12.2 | 6.8 |
| Found | 45.63 | 6.50 | 5.56 | 12.5 | 7.5 |

The filtrate contained no unreacted styrene. It was extracted with diethyl ether and the extract dried overnight over anhydrous calcium sulfate. Less than 1 part by weight of oil was recovered after removal of the solvent.

The extracted filtrate was made strongly basic with 20% aqueous sodium hydroxide solution (i. e., a pH of 10 as indicated by Hydrion paper) and the causticized filtrate extracted with diethyl ether. The extract was dried over anhydrous calcium sulfate and, after removal of the solvent, about 69 parts by weight of clear, pale yellow, viscous liquid remained. This liquid crystallized on standing and appeared to be composed entirely of III.

Further addition of 20% caustic to the aforetreated filtrate caused no separation of water-insoluble liquid.

EXAMPLE IV

About 150 milliliters of 20% aqueous sodium hydroxide solution were added to about 50 grams of crude N-(3-hydroxy-3-phenylpropyl)-aminomethylsulfonic acid from Example III and the mixture thoroughly mixed. About 150 milliliters of water were added and the mixture was heated on a steam bath for about 15 minutes, cooled to room temperature (15°–20° C.) and extracted with diethyl ether. The extract was dried over anhydrous calcium sulfate and, after removal of the solvent, 19 grams of liquid remained. This liquid on standing crystallized to III. A considerable loss of product as the soluble sodium sulfonate salt was suffered.

EXAMPLE V

About 150 milliliters of methanol and about 150 milliliters of water were added to about 122 grams of N-(3-hydroxy-3-phenylpropyl)-aminomethylsulfonic acid. The mixture was stirred at room temperature for 7 hours and allowed to stand for about 16 hours. The mixture was then heated to reflux (80°–82° C.) for 7 hours during which operation the solid disappeared and sulfur dioxide was evolved. The excess methanol was removed by distillation. (The still temperature was allowed to rise to 95° C). The still residue was cooled to room temperature and 14 grams of unreacted material separated. The filtrate was treated with excess caustic, extracted with diethyl ether, dried over anhydrous calcium sulfate and the solvent removed. About 35 grams of clear oil remained. This oil would not form a phenylthiourea when treated with phenyl-isothiocyanate in the conventional manner. However, the oil crystallized on standing to III, bis-(phenyl-1,3-tetrahydrooxazino)-methane.

There is evidence that the phenyl-1,3-tetrahydrooxazine formed in this reaction rearranges

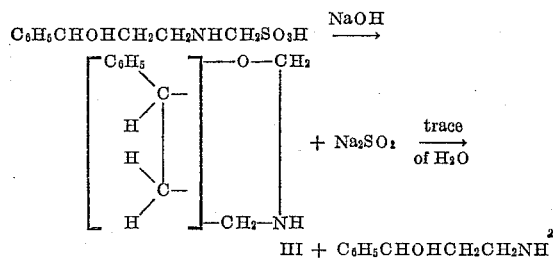

in accordance with the following equation:
In fact it has been observed that very pure phenyl-tetrahydro-1,3-oxazine undergoes this reaction in a sealed bottle.

EXAMPLE VI

About 56 parts by weight of aminomethylsulfonic acid and about 84 parts by weight of 36% aqueous formaldehyde solution were added to about 56 parts by weight of diisobutylene. The mixture was agitated vigorously and heated to 45° C. The heating was continued until the temperature of the reaction mass reached 65° C. The source of external heat was removed but the temperature rose to about 73° C. and then was allowed to fall slowly to about 40° C. The reaction mixture was filtered and 16 parts by weight of solid recovered. After recrystallization from hot ethanol the melting point of the crystals was 143°–144° C.

EXAMPLE VII

About 56 parts by weight of aminomethylsulfonic acid and about 84 parts by weight of 36% aqueous formaldehyde solution were added to about 28 parts by weight of diisobutylene. The mixture was warmed slowly to reflux, 75°–81° C., and held at about 81° C. for 30 minutes. After cooling, about 3 parts by weight of diisobutylene were recovered. After seeding with some crystals from the previous run (Example VI) and standing for about 16 hours, the crystalline sulfonic acid could be removed by filtration. Upon recrystallization from hot ethanol the material had a melting point of 143°–144° C. and analyzed as follows:

Calculated for $C_{10}H_{25}NO_5S$ (monohydrate)— 5.13% N.
Calculated for $C_{10}H_{23}NO_4S$ (unhydrated)— 5.53% N.
Found: 5.56 and 5.61% nitrogen.

The higher melting point of this material indicated that it was not hydrated as was the sulfonic acid from styrene. (Considerable difficulty is encountered in burning these materials, high carbon and low hydrogen contents are obtained but check analytical runs on the same sample usually vary by about 1%).

Caustic neutralization of the mother liquor from the foregoing filtration yielded about 18 parts by weight of liquid amine containing 9.81% nitrogen.

EXAMPLE VIII

About 216 parts by weight of ammonium chloride, about 650 parts by weight of 36% aqueous formaldehyde and about 300 parts by weight of water were added to about 336 parts by weight of diisobutylene. The resultant mixture was agitated at room temperature (15°–25° C.) and a rapid stream of sulfur dioxide gas was introduced into the aforesaid mixture. The temperature of the mixture was allowed to rise to about 75° C. and then controlled by external cooling and held at that temperature for about 15 minutes. Thereafter the rate of introduction of the sulfur dioxide was reduced considerably. After about 15 minutes the temperature began to fall. Thereafter the reaction mixture was refluxed for about 5 hours, the final reflux temperature being about 87° C. The water-insoluble layer was separated and, on standing, turned black.

Distillation of the water insoluble material yielded some unreacted diisobutylene, but the major portion of the material boiled above the boiling point of diisobutylene. The pertinent data for this distillation is tabulated as follows:

TABLE I

| Fraction No. | B. P., °C. | Pressure, mm. Hg | Refractive Index, $n_D^{19}$ |
|---|---|---|---|
| IBP | 30 | 2 | |
| 1 | 50 | 2 | 1.4504 |
| 2 | 52 | 2 | 1.4570 |
| 3 | 90–95 | 2 | 1.4738 |

These fractions contain no nitrogen.

The aqueous layer of the reaction mixture was neutralized with caustic, extracted with benzene and the extract dried over anhydrous calcium sulfate. After removal of the drying agent by filtration and the solvent by distillation about 324 parts by weight of product remained.

A portion of this product was distilled with the results indicated in the following table:

TABLE II

| Fraction No. | Still Temp., °C. | Vapor Temp., °C. | Pressure, mm. Hg | Parts by Weight | $n_D^{20}$ |
|---|---|---|---|---|---|
| IBP | 92 | 42 | 2.2 | | |
| 1 | 106 | 62 | 2.0 | 4 | 1.4620 |
| 2 | 115 | 72 | 2.0 | 14 | 1.4654 |
| 3 | 123 | 82 | 2.0 | 11.5 | 1.4720 |
| 4 | 126 | 87 | 2.0 | 15 | 1.4752 |
| 5 | 133 | 87 | 2.0 | 51.5 | 1.4772 |
| 6 | 138 | 87 | 2.0 | 20 | 1.4774 |
| | 148 | 103 | 2.0 | | |
| 7 | 155 | 111 | 2.0 | 16 | 1.4830 |
| 8 | 165 | 111 | 2.0 | 14 | 1.4840 |
| Residuum | | | | 66 | |

The residuum was a brown, brittle, thermoplastic resin.

Analysis

| Fraction No. | Percent Nitrogen |
|---|---|
| 2 | 5.75 |
| 5 | 7.46 |
| 8 | 7.92 |
| Residuum | 7.74 |
| Original product before distillation | 6.74 |

Calculated for $C_{10}H_{21}NO$.
Nitrogen = 8.18%

Study of the foregoing data indicates that Fraction No. 5 has as its primary constituent an oxazine type compound, that Fraction 8 has as its primary constituent a compound corresponding closely to the amount of nitrogen found in $C_{10}H_{21}NO$, the empirical formula of the oxazine found in cut 5 but probably is a new compound.

EXAMPLE IX

About 104 parts by weight of styrene (about 1 mole), about 335 parts by weight of a 36% aqueous formaldehyde solution (about 4 moles $CH_2O$) and about 108 parts by weight of ammonium chloride (about 2 moles) were mixed, stirred vigorously and heated to about 80° C. The temperature of the reaction mixture was maintained at about 75° to about 80° C. for about 2 hours. The mixture was cooled to room temperature (15°–25° C.) and was extracted with diethyl ether. (About 37 parts by weight of styrene were recovered from this extract.)

About 256 parts by weight of methanol (about 8 moles) were added to the extracted reaction mixture and the resultant mixture allowed to stand for about 16 hours.

The methylal and excess methanol were distilled from the reaction mixture (pot heated to about 95° C.). The mixture (pot residue) was cooled to room temperature, caustic neutralized with 20% aqueous sodium hydroxide solution to a pH of about 10 (by Hydrion paper), cooled to room temperature (15°–25° C.), and extracted with diethyl ether. The extract was dried over anhydrous calcium sulfate (Drierite) and the extracted reaction mixture discarded. The "Drierite" was filtered from the extract and the solvent removed. About 82 parts by weight of liquid was recovered which was distilled through a short Claisen head under a vacuum. The log of the distillation is given below:

TABLE III

| Fraction No. | Vapor Temp., °C. | Pressure, mm. Hg | $n_D^{20}$ | Parts by Weight |
|---|---|---|---|---|
| IBP | 67 | 1.0 | | |
| 1 | 72.5 | 1.0 | 1.5270 | 2 |
| 2 | 75 | 1.1 | 1.5275 | 3 |
| 3 | 80 | 1.1 | 1.5286 | 2 |
| 4 | 85 | 1.1 | 1.5303 | 4 |
| 5 | 90 | 1.1 | 1.5330 | 7 |
| 6 | 100 | 1.1 | 1.5378 | 5 |
| 7 | 110 | 1.2 | 1.5412 | 10 |
| 8 | 120 | 1.5 | 1.5450 | 8 |
| 9 | 123 | 1.2 | 1.5485 | 12 |
| 10 | 125 | 1.2 | 1.5510 | 10 |
| 11 | 130 | 0.5 | 1.5588 | 3 |
| Still Residue | | | | 9 |

Fractions 7 and 10 both formed phenylthioureas when treated in accordance with standard procedures. After recrystallization from ethanol, the melting points were 124°–125° C. The mixed melting point of these two thioureas showed no depression.

Fractions 1 through 10 were recombined and redistilled through a glass helices packed column. The log of this distillation is given in the following tabulation:

TABLE IV

| Fraction No. | Vapor Temp., °C. | Pressure, mm. Hg | Parts by Weight |
|---|---|---|---|
| IBP | 38 | 0.1 | |
| 1 | 45 | 0.1 | 4 |
| 2 | 56 | 0.2 | 3 |
| 3 | 56 | 0.1 | 4 |
| 4 | 59 | 0.1 | 5 |
| 5 | 77 | 0.5 | 2 |
| 6 | 80 | 0.6 | 4 |
| 7 | 82 | 0.6 | 4 |
| 8 | 87 | 0.6 | 6 |
| 9 | 90 | 0.6 | 3 |
| 10 | 86 | 0.09 | 2 |
| 11 | 88 | 0.1 | 2 |
| 12 | 93 | 0.4 | 1 |
| Still Residue | | | 7 |

Fractions 10, 11 and 12 partially crystallized on standing indicating the presence of a small amount of the compound $C_6H_5CHOHCH_2CH_2NH_2$. Fraction 7 found: C, 72.08; H, 8.19; N, 8.13; active hydrogen, 0.523; 0.513. Fractions 3 through 9 are relatively pure phenyl-1,3-tetrahydrooxazine.

EXAMPLE X

About 1 mole of formaldehyde (as a 36% aqueous solution), about 1 mole of aminomethylsulfonic acid and about 50 parts by weight of water were added to about 1 mole of diisobutylene. The mixture was agitated and heated to about 70° C. Thereafter the temperature was controlled at about 65° to about 70° C. and the reaction mixture held at that temperature for about 0.5 hour. The mixture was cooled to room temperature and insoluble product separated. After recrystallization from hot ethanol, the product melted at 140.5–141.5° C.

The liquid separated from the solid product was neutralized with 20% aqueous caustic solution and extracted with diethyl ether. The extract was dried over anhydrous calcium sulfate, the solvent removed and about 20 parts by weight of oil recovered. This oil crystallized upon standing. After recrystallization from n-heptane the product melted at 129°–130° C.

*Analyses*

| | Percent C | Percent H | Percent N |
|---|---|---|---|
| Calculated for $C_{21}H_{42}N_2O_2$* | 71.08 | 11.89 | 7.91 |
| Found | 70.43 | 11.89 | 8.07 |

* Bis-(tetrahydrooxazino)-methane derivative.

EXAMPLE XI

About 5 moles of formaldehyde as a 36% aqueous solution, about 5 moles of aminomethylsulfonic acid, about 250 parts by weight of water and about 5 moles of diisobutylene were mixed, stirred vigorously and heated to about 65° C. Although the source of external heat was removed the reaction temperature rose to about 73° C. and remained at that point for about 15 minutes. Thereafter the temperature fell. When the temperature reached about 71° C. external heat was applied and the reaction temperature maintained at about 70°–75° C. for about 0.5 hour. The mixture was cooled to ambient temperatures (about 25° C.). Thereafter, the reaction mixture was treated with 1200 parts by weight of a 50% aqueous sodium hydroxide. (During the addition of the base the temperature of the reaction mixture was held below about 40° C.) A small amount of solid separated and was removed. The reaction mixture so-treated was extracted with diethyl ether and the extract was dried over anhydrous calcium sulfate. After removal of the solvent on a steam bath, about 205 parts by weight of oil remained. A portion of this material was distilled to yield an amine fraction boiling at 70°–131° C. at 0.8 mm. of Hg having a refractive index $n_D^{20}$ 1.471. The first portion of the distillate formed a liquid phenylthiourea and a crystalline methiodide. The methiodide melted at 141°–142° C. after several recrystallizations from absolute alcohol and was found to be identical to the methiodide of the same melting point described in co-pending application Serial No. 129,948.

EXAMPLE XII

About 0.5 mole of aminomethylsulfonic acid and about 0.5 mole of formaldehyde (as a 36% aqueous solution) were added to about 60 parts by weight of polymer gasoline. The mixture was stirred vigorously and heated to reflux (about 79°–80° C.) for about 1 hour. The reaction mixture was cooled to room temperature (about 27° C.) and the unreacted aminomethylsulfonic acid separated. The fluid reaction mixture stratified into two layers and about 39 parts by weight of unreacted gasoline was recovered. The aqueous layer was treated with an excess of caustic and extracted with diethyl ether. The extract was dried over anhydrous calcium sulfate and the solvent removed to leave an oil having a nitrogen content of 16.25 per cent.

EXAMPLE XIII

About 0.5 mole of aminomethylsulfonic acid, about 0.6 mole of formaldehyde (as a 36% aqueous solution) and about 1.75 moles of glacial acetic acid were added to about 0.5 mole of triisobutylene. The mixture was stirred and heated at reflux (about 85° C.) for about 5 hours. The water immiscible layer separated and the aqueous layer of the reaction mixture was caustic neutralized, extracted with diethyl ether and the solvent evaporated. The product contained 3.35% nitrogen.

EXAMPLE XIV

About 0.16 mole of N-methylaminomethylsulfonic acid, about 0.18 mole of formaldehyde (as a 36% aqueous solution), and about 25 parts by weight of water were added to about 0.14 mole of styrene. The reaction mixture was stirred and heated to about 70°–80° C. for about 1 hour, cooled and allowed to stand at room temperature for about 16 hours. Crystalline material appeared, was separated and recrystallized from ethanol. The melting point after recrystalization was 148°–150° C. The crystalline material was found to contain 6.56% nitrogen, 14.2% sulfur.

Unreacted styrene was extracted from the separated liquid reaction mixture and the aqueous layer of the reaction mixture caustic neutralized and extracted with diethyl ether. Upon removal of the solvent an oil remained which contained about 12.47% nitrogen. This oil formed a liquid picrate.

EXAMPLE XV

About 2 moles of aminomethylsulfonic acid, about 2 moles of formaldehyde (as a 36% aqueous solution) and about 250 parts by weight of water were added to about 0.5 mole of alpha-methylstyrene. The mixture was stirred and heated slowly to about 40° C. Although the source of external heat was removed the reaction temperature continued to rise. At about 45° C. a noticeable change in the appearance of the reaction mixture began to take place. At about 55° C. the mixture had become so viscous that stirring was not effective. About 100 parts by weight of water were added but this did not reduce the viscosity of the reaction mixture effectively. The reaction mixture was held at about 48°–55° C. for about 1 hour.

About 215 parts by weight of crystalline material contaminated with aminomethylsulfonic acid was separated from the reaction mixture and was recrystallized from ethanol. The melting point after recrystallization was 148.5°–150.5° C. (with decomposition). The recrystallized material was analyzed with the following results:

|  | Percent C | Percent H | Percent N | Percent S |
|---|---|---|---|---|
| Calculated for $C_{11}H_{17}NO_4S$ | 50.96 | 6.56 | 5.40 | 12.36 |
| Found | 50.88 | 5.77 | 5.88 | 12.44 |
|  | 50.95 | 5.61 | 5.99 |  |

The aqueous portion of the reaction mixture was neutralized with 3 moles of potassium hydroxide, cooled and extracted with diethyl ether. The extract was dried and the solvent removed to leave an amine which contained 11.51% nitrogen.

EXAMPLE XVI

About 1 mole of aminomethylsulfonic acid and about 500 parts by weight of water were mixed, stirred and heated to about 70° C. About 1 mole of formaldehyde (as a 36% aqueous solution) was added to the mixture and the reaction mixture temperature held at about 70° C. (The aminomethylsulfonic acid was in solution completely at this point.) About 0.16 mole of alpha-methylstyrene was added to the reaction mixture and the temperature rapidly rose to about 73.5° C. After about 1.25 hour, the temperature began to fall. (All of the alpha-methylstyrene was in solution at this point.) The reaction mixture was then held at about 80°–90° C. for about 2 hours. The reaction mixture was cooled to room temperature and allowed to stand at room temperature for about 16 hours. The reaction mixture was treated with about 1.5 moles of caustic, cooled, and extracted with diethyl ether. Removal of the solvent from the extract yielded a crude amine having a nitrogen content of 9.31 per cent.

The aqueous reaction mixture after causticization and extraction was treated with an additional mole of sodium hydroxide, heated on a steam bath for about 3 hours and allowed to stand about 16 hours. The reaction mixture was then extracted with diethyl ether. An amine having a nitrogen content of 12.57% was obtained after removal of the solvent from the extract.

The foregoing nitrogen values indicate that the first product was a mixture of the three amines listed hereinafter and that the second product was substantially pure amine III.

The three amines obtainable from alpha-methylstyrene and the nitrogen content thereof are:

| | | Calculated Percent Nitrogen |
|---|---|---|
| I | $C_6H_5-\underset{\underset{OH}{\mid}}{\overset{\overset{CH_3}{\mid}}{C}}-CH_2-CH_2N=CH_2$ | 7.90 |
| II | $C_6H_5\underset{\underset{}{}}{\overset{\overset{CH_2}{\parallel}}{C}}-CH_2-CH_2N=CH_2$ | 8.83 |
| III | $C_6H_5C\underset{\diagdown CH_2CH_2N=CH_2}{\overset{\diagup CH_2CH_2N=CH_2}{-}}OH$ | 12.75 |

EXAMPLE XVII

About 1 mole of formaldehyde (as a 36% aqueous solution), about 100 parts by weight of water and about 1 mole of aminomethylsulfonic acid were mixed, stirred vigorously and a stream of gaseous isobutylene introduced into the mixture for about 15 minutes. During that time the reaction mixture was heated slowly to about 65° C. and then at about 65°–68° C. for about 3.5 hours. (At this point all of the solid had disappeared.) Heating at about 65°–68° C. was continued for about 0.25 hour, for a total time at about 65°–68° C. of about 3.75 hours. Thereafter the mixture was cooled to ambient temperatures and the introduction of the gaseous isobutylene stopped. The reaction mixture was extracted with diethyl ether and the extract dried over anhydrous calcium sulfate. Removal of the solvent yielded an oil containing 1.02% nitrogen.

The extracted reaction mixture was treated with an excess of aqueous 20% sodium hydroxide solution and extracted with diethyl ether. After removal of the solvent a small amount of oil remained containing 12.92% nitrogen.

Water was distilled from the causticized extracted reaction mixture and the residue extracted with boiling ethanol. A dark oil of pungent odor was recovered from the ethanol extract. This oil solidified upon standing. The solid contained 7.49% nitrogen.

EXAMPLE XVIII

About 5.2 moles of aminomethylsulfonic acid, about 5 moles of formaldehyde (as a 36% aqueous solution) and about 250 parts of water were mixed and placed in a pressure resistant container fitted with a stirrer. About 5.3 moles of liquid isobutylene were pumped into the container during about 15 minutes. While the olefin was being introduced into the container the temperature rose from about 65° F. to about 95° F. Stirring was continued and the temperature continued to rise to a maximum of 107° F. (pressure 60 p. s. i. g.) about 20 minutes after the addition of the olefin had been completed. The reaction mixture was cooled slowly to ambient temperatures and the residual pressure (35 p. s. i. g.) was released.

The reaction mixture, a thick white slurry, was filtered and the filter cake dried under suction for about 48 hours. After four recrystallizations from 95% ethanol the melting point of the crystalline product was 122°–123° C. (with decomposition). The crystalline product was analyzed with the results indicated in the following tabulation:

| | Percent N | Percent S | Percent H₂O |
|---|---|---|---|
| Calculated for $(C_6H_{15}NO_2S)_2 \cdot H_2O$ | 6.80 | 15.53 | 4.4 |
| Found | 6.85 | 15.65 | 4.6 |

The filtrate was treated with 200 parts by weight of sodium hydroxide as a 50% aqueous solution, cooled to ambient temperature and extracted with diethyl ether. The extract was dried over anhydrous calcium sulfate, the solvent removed and a liquid amine product obtained.

EXAMPLE XIX

About 2 moles of aminomethylsulfonic acid were added to a mixture of about 2 moles of 2-ethyl-1-hexene, about 2.4 moles of formaldehyde (as a 36% aqueous solution) and about 100 parts by weight of water. The mixture was stirred and heated to about 65° C. The reaction temperature was held at about 65°–70° C. for about 0.5 hour and then allowed to fall slowly to about 50° C. The reaction mixture was cooled to about 15° C. and filtered. The filter-cake was washed with water then with ether and then with 95% ethanol, after which the filter-cake was air-dried for about 16 hours. A sample of the sulfonic acid was recrystallized from absolute ethanol and found to have a melting point of 133°–134° C. Analyses of the recrystallized material gave the results tabulated hereinafter:

| | Percent N | Percent S |
|---|---|---|
| Calculated for $C_{10}H_{23}NO_4S$ | 5.53 | 12.65 |
| Found | 5.59 | 12.20 |

The filtrate was extracted with diethyl ether and the extracted filtrate treated with about 80 parts by weight of sodium hydroxide. The causticized filtrate was extracted with diethyl ether. Removal of the solvent from the extract yielded about 105 parts by weight of a liquid amine.

Further causticization of the extracted filtrate yield no further amounts of amine.

EXAMPLE XX

About 2 moles of 2-methyl-1-pentene, about 3 moles of formaldehyde (as a 36% aqueous solution) and about 100 parts by weight of water were added to about 2.9 moles of aminomethylsulfonic acid. The mixture was stirred and heated to about 50° C. After the heater was removed the reaction temperature rose to about 57° C., remained at that point for about 15 minutes and then began to fall. The mixture was cooled to room temperature, allowed to stand about 16 hours and filtered. The filter-cake was washed with water and then with ethanol and air-dried for about 16 hours. (The ethanol washings were evaporated and the residue added to the filtrate.) A sample of the acid of the filter-cake was recrystallized from absolute ethanol. The recrystallized sulfonic acid melted at 131°–133° C. and analyzed as follows:

| | Percent N | Percent S |
|---|---|---|
| Calculated for $C_8H_{19}NO_4S$ | 6.22 | 14.2 |
| Found | 6.01 | 13.6 |

The filtrate was washed with diethyl ether and then causticized with 400 parts by weight of aqueous 40% sodium hydroxide solution. The causticized filtrate was extracted with diethyl ether, the extract dried over anhydrous calcium sulfate, the solvent removed and about 197 parts by weight of amine recovered.

EXAMPLE XXI

About 2 moles of 2-ethyl-1-butene, about 3 moles of formaldehyde (as a 36% aqueous solution) and about 100 parts by weight of water were mixed with about 2.9 moles of aminomethylsulfonic acid. The resultant mixture was heated to about 50° C. and the heater removed; after which the temperature rose to about 57° C. The temperature remained at that point for about 15 minutes and then began to fall. The reaction mixture was cooled to ambient temperatures and allowed to stand for about 16 hours.

The reaction mixture was filtered and the filter-cake air dried. About 289 parts by weight of substituted aminomethylsulfonic acid were obtained. A sample of the substituted aminomethylsulfonic acid was recrystallized from absolute ethanol and found to have a melting point of 138°–139° C. (with decomposition). Analyses of the recrystallized material gave these data:

|  | Percent N | Percent S |
|---|---|---|
| Calculated for $C_8H_{19}NO_4S$ | 6.22 | 14.2 |
| Found | 5.92 | 13.8 |

EXAMPLE XXII

About 1 mole of aminomethylsulfonic acid and about 1 mole of formaldehyde (as a 36% aqueous solution) were added to about 1 mole of alpha-pinene. The mixture was stirred vigorously and heated to about 85° C. The heater was removed and the mixture cooled slowly to about 25° C. About 166 parts by weight of white solid was removed from the reaction mixture as a filter-cake. (This solid could not be recrystallized from methanol, ethanol, water or n-heptane.) Treatment of this solid with an excess of aqueous 20% caustic solution and heating on a steam bath yielded a cold-flowing resin.

The filtrate was extracted with diethyl ether and the extract dried over anhydrous calcium sulfate. Removal of the solvent yielded about 0.2 mole of alpha-pinene.

The extracted filtrate was causticized with aqueous 20% sodium hydroxide solution and extracted with diethyl ether and then with benzene. The oil, which had separated upon causticization, did not appear to be very soluble in either solvent. The extract was dried, the solvent removed and about 20 parts by weight of oil obtained. An additional 13 parts by weight of a pale, yellow, viscous liquid were obtained by extracting the causticized reaction mixture first with chloroform and then again with diethyl ether.

EXAMPLE XXIII

About 1 mole of formaldehyde (as a 36% aqueous solution), about 100 parts by weight of water and about 1 mole of beta-pinene were mixed with about 1 mole of aminomethylsulfonic acid. The reaction mixture was stirred and the temperature rose slowly to a maximum of about 61° C. about 40 minutes after the beta-pinene was added. The reaction mixture was cooled slowly to ambient temperatures and filtered. The filter-cake was water-washed and dried. After standing about 16 hours more crystals formed in the filtrate. These were separated and added to the main crop. In all about 97 parts by weight of the product were recovered. The ultimate filtrate was extracted with diethyl ether and the extract dried over anhydrous calcium sulfate. Removal of the solvent yielded about 20 parts by weight of liquid.

The extracted filtrate was causticized with about 220 parts by weight of aqueous 40% sodium hydroxide solution and a light polymeric material separated. The aqueous portion of the mixture was decanted and the resin washed with acetone and then with ether. About 134 parts by weight of this free base was obtained. This material, as the free base, can be dispersed into a stable colloidal dispersion simply by boiling with water.

EXAMPLE XXIV

To about 1 mole of aminomethylsulfonic acid were added about 1 mole of formaldehyde (as paraformaldehyde), about 224 parts by weight of glacial acetic acid and about 1 mole of 1-octene. The mixture was stirred vigorously and heated to about 75° C. The temperature was held at about 75°–80° C. for about 1 hour, then cooled to room temperature and about 93 parts by weight of solid was removed by filtration. (The solid could not be dissolved in hot absolute ethanol.) The organic layer of the reaction mixture (about 88 parts by weight) was separated from the filtrate and the aqueous portion was treated with about 200 parts by weight of sodium hydroxide and enough water to redissolve the salt which separated when the mixture was neutralized. The neutralized mixture was extracted with diethyl ether and the extract dried over anhydrous calcium sulfate. Removal of the solvent yielded about 6 parts by weight of oil analyzing 11.34% nitrogen.

While the foregoing examples have illustrated the use of aminoalkylsulfonic acids in the aminoalkylation of olefins the following illustrative but not limiting examples show that aminoalkyl- and particular aminomethyl-sulfonic acid can be used generally in the Mannich reaction.

EXAMPLE XXV

About 0.55 mole of formaldehyde (as a 36% aqueous solution) and about 0.5 mole of aminomethylsulfonic acid were added to about 0.5 mole of anisole. The mixture was stirred, heated to about 80° C., held at about 80°–85° C. for two hours, and cooled to room temperature. The water-immiscible layer was separated and the aqueous layer caustic neutralized, extracted with diethyl ether, refluxed for about an hour, and extracted with diethyl ether. After drying, the solvent was removed and the product containing 2.57% nitrogen recovered.

EXAMPLE XXVI

About 0.6 mole of formaldehyde (as a 36% aqueous solution), about 0.6 mole of phenol and about 100 parts by weight of water were added to about 0.5 mole of aminomethylsulfonic acid. The reaction mixture was stirred and heated to about 48° C. and the reaction temperature held at about 50°–52° C. for about 0.5 hour at which time the reaction mixture was a clear solution. The mixture was stirred until the temperature thereof fell to room temperature and then was neutralized with sodium bicarbonate. The water-immiscible material was extracted with hot benzene and after removal of the solvent a viscous oil remained. The nitrogen content of this oil was 5.85 per cent.

The aqueous layer of neutralized reaction mixture was heated on a steam bath for about 16 hours and a light yellow resinous material separated. This resinous material was separated, dried and found to contain 6.85% nitrogen and 1.55% sulfur. This sulfur content is residual and not indicative of the sulfur content of all resinous compositions from this source.

EXAMPLE XXVII

About 0.5 mole of cyclohexanone, about 0.6 mole of formaldehyde (as a 36% aqueous solution) and about 50 parts by weight of water were added to about 0.5 mole of aminomethylsulfonic acid. The reaction mixture was stirred and heated to 50° C. The source of external heat removed but the temperature continued to rise and was held at about 70° C. by means of external cooling. After the reaction had stopped the reaction mixture was cooled to room temperature. The reaction mixture was caustic neutralized and extracted with diethyl ether. The solvent was removed and the oil remaining found to contain 7.89% nitrogen.

EXAMPLE XXVIII

To about 0.5 mole of aminomethylsulfonic acid were added 0.5 mole of formaldehyde (as an aqueous 36% solution) and about 25 parts by weight of water. The mixture was stirred vigorously and cooled to about 5° C. About 34 parts by weight of pyrrole were added portion-wise while maintaining the reaction temperature at about 5°–10° C. During the addition of the pyrrole the reaction mixture became almost solid and about 100 parts by weight of water were added to facilitate agitation.

The temperature of the mixture was allowed to rise to ambient temperature and the reaction mixture was filtered. About 100 parts by weight of water were added to facilitate removal of the reaction mixture slurry from the reactor. The filter-cake was a red powder and represented a yield of about 95 parts by weight. Attempts to recrystallize the product were unsuccessful. Upon standing the product gradually decomposed.

The filtrate was neutralized with 20% aqueous sodium hydroxide and was extracted with diethyl ether after drying the extract and removing the solvent a small yield of oil was obtained.

EXAMPLE XXIX

About 0.6 mole of aminomethylsulfonic acid, about 0.6 mole of acetophenone, about 0.6 mole of formaldehyde (as a 36% aqueous solution) and about 65 parts by weight of water were mixed, stirred and heated slowly to about 89° C. The heater was removed and the reaction mixture cooled slowly, with stirring, to room temperature. The solid was separated from the liquid portion of the reaction mixture and discarded. The liquid fraction was allowed to stand for about thirty days. At the end of this period about 3 parts by weight of crystals were filtered off and recrystallized from ethanol. The recrystallized product melted at 141°–144° C. and had a nitrogen content of 6.60 per cent.

From the foregoing general discussion and the detailed description provided by the illustrative but not limiting examples it will be understood by those skilled in the art that compounds having at least one hydrogen atom of pronounced reactivity will react with formaldehyde and aminoalkylsulfonic acids, $RNHCH_2SO_3H$, where R is hydrogen or an alkyl group to yield substituted aminoalkylsulfonic acids which upon decomposition by causticization for example, yield amines. Furthermore, from the foregoing discussion and the detailed description provided by the illustrative but not limiting examples it will be understood by those skilled in the art that olefinic compounds react with formaldehyde and aminoalkylsulfonic acids, $RNHCH_2SO_3H$, where R is hydrogen or an alkyl group to yield substituted aminoalkylsulfonic acids which upon decomposition by causticization for example, yield amines or bis-(substituted tetrahydro-1,3-oxazino)-methanes. Accordingly, the present invention provides a method for making substituted aminoalkylsulfonic acids and amines by the reaction between a compound having at least one reactive hydrogen atom as defined by Blicke in "Organic Reactions" vol. I (Wiley 1942) page 305 or olefinic compounds having a composition corresponding to the formula

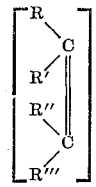

wherein R is hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, and a heterocyclic group; R' is R, hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, or a heterocyclic group, R'' is R, R', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, or a heterocyclic group, and R''' is R, R' and R'', hydrogen, an alkyl group having less than 17 carbon atoms, an aryl group, an alkaryl group in which the alkyl substituent has less than 9 carbon atoms, an aralkyl group in which the alkyl portion of the group has less than 9 carbon atoms, a cycloalkyl group, or a heterocyclic group, formaldehyde, either gaseous, aqueous or polymeric, (in the latter case in the presence of a depolymerizing catalyst such as water, acetic acid, etc.) an aminoalkylsulfonic acid corresponding to the formula $R^{iv}NHCH_2SO_3H$ wherein $R^{iv}$ is hydrogen or an alkyl group and water. Furthermore, when any of R, R', R'' and R''' is other than H or $CH_3$, it may be substituted with such groups as $NO_2$, CH, X, COOH, etc. (X=Cl, Br or I). These substituents preferably are removed by at least 2 carbon atoms from the olefinic moiety. However, there are two limitations, to wit; no more than three and preferably, only two, of R, R', R'' and R''' may be substituents, other than hydrogen and when one of the pair of substituents, R, R' or R", R'" is hydrogen and the other substituents, R" and R'" or R and R' are hydrogen, then the other member of the pair shall be a substituent having a double bond in conjugation with the double bond of the parent olefin. Thus, for example, when R or R' is hydrogen and R" and R'" are hydrogen, the other substituent shall be a substituent having a double bond in conjugation with the double bond in the parent olefin. Similarly, when R" or R'" is hydrogen and R and R' are hydrogen, the other substituent shall be one having a double bond in conjugation with the double bond of the parent olefin.

We claim:

1. A method for producing diisobutylene substituted aminomethylsulfonic acid which comprises mixing aminomethylsulfonic acid, formaldehyde and diisobutylene, heating the solution to about 75° to about 80° C., cooling the reaction mixture until solid separates, and recovering said solid.

2. A method for preparing a substituted aminomethylsulfonic acid corresponding in composition to the formula,

R'R"COHCH$_2$CH$_2$NHCH$_2$SO$_3$H where R' is selected from the group consisting of hydrogen atoms and alkyl radicals and R" is an alkyl group which comprises mixing aminomethylsulfonic acid, formaldehyde and polymer gasoline containing olefinic compounds, heating the reaction mixture to reflux temperature, cooling the reaction mixture to room temperature, stratifying the reaction mixture into three phases, a solid phase, an aqueous phase and a hydrocarbon phase, separating the aqueous phase from the remainder of the reaction mixture, and recovering the substituted aminomethylsulfonic acid therefrom.

3. A method for preparing hydroxyphenylpropyl-N-methyl aminomethylsulfonic acid which comprises mixing N-methylaminomethylsulfonic acid, formaldehyde and styrene to form a reaction mixture, heating the reaction mixture to about 70°–80° C., cooling to room temperature, and separating crystalline material.

4. A method for making the N-substituted aminomethylsulfonic acid of isobutylene which comprises mixing aminomethylsulfonic acid, formaldehyde and isobutylene to form a reaction mixture, allowing the reaction temperature to rise to about 110° C., cooling the reaction mixture to ambient temperatures, and separating a solid, said solid being said N-substituted aminomethylsulfonic acid.

5. A method for preparing N-substituted aminomethylsulfonic acid of 2-ethyl-1-hexene which comprises mixing aminomethylsulfonic acid, formaldehyde and 2-ethyl-1-hexene to form a reaction mixture, heating the reaction mixture to about 65°–70° C., cooling said reaction mixture to room temperature, and separating a solid.

6. A process for preparing a substituted aminomethylsulfonic acid, which comprises reacting an ethylenically unsaturated hydrocarbon, formaldehyde, and an aminoalkylsulfonic acid having the formula, RNHCH$_2$SO$_3$H, wherein R is selected from the group consisting of hydrogen atoms and alkyl groups, at a temperature not greater than about 110° C., cooling the reaction mixture to ambient temperature, and separating a substituted aminomethylsulfonic acid therefrom.

References Cited in the file of this patent

UNITED STATES PATENTS

| Number | Name | Date |
|---|---|---|
| 1,999,432 | Ulrich et al. | Apr. 30, 1935 |
| 2,373,870 | Coffman et al. | Apr. 17, 1945 |

OTHER REFERENCES

Adams et al., "Organic Reactions," vol. 1, pp. 304–314, 327–330, 333 (1942).

"Condensed Chem. Dictionary" (Reinhold, 3rd ed.) (1942).

Tverdokhlebov: Chem. Abstracts, vol. 41, cols. 7649–50 (1942).